(12) United States Patent
Malinowski

(10) Patent No.: US 6,499,696 B1
(45) Date of Patent: Dec. 31, 2002

(54) ROCKET ENGINE WITH REDUCED THRUST AND STAGABLE VENTING SYSTEM

(75) Inventor: Martin R. Malinowski, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/810,850

(22) Filed: Mar. 16, 2001

(51) Int. Cl.$^7$ ................................................ B64G 9/00
(52) U.S. Cl. ................................... 244/158 R; 244/172
(58) Field of Search ............................ 244/158 R, 172, 244/17.19; 239/265.25, 265.27, 265.31; 222/633, 630

(56) References Cited

U.S. PATENT DOCUMENTS 3,025,667 A * 3/1962 Moorehead
3,112,616 A * 12/1963 Adamson et al.
3,304,724 A * 2/1967 Blumrich et al.
4,441,670 A * 4/1984 Crepin
5,042,605 A * 8/1991 Moriwake
5,143,328 A * 9/1992 Leonard

* cited by examiner

Primary Examiner—Charles T. Jordan
Assistant Examiner—T. Dinh
(74) Attorney, Agent, or Firm—Marsh Fischmann & Breyfogle LLP

(57) ABSTRACT

A rocket having a rocket engine vent system for a rocket engine is disclosed. The rocket engine vent system includes at least one rocket engine vent system conduit having a pair of vent apertures that are disposed on opposite sides of this conduit (i.e., disposed in opposing relation). A diverter with a pair of vanes is disposed within this rocket engine vent system conduit. One diverter vane projects toward one of the vent apertures, while the other diverter vane projects toward the other vent aperture. Two separate and discrete fluid flows are thereby directed out of the rocket engine vent system conduit in at least generally opposite directions, which significantly reduces the thrust to which the rocket engine is exposed when venting rocket fuel therefrom under high pressure conditions.

34 Claims, 6 Drawing Sheets

ROCKET ENGINE WITH REDUCED THRUST AND STAGABLE VENTING SYSTEM

FIELD OF THE INVENTION

The present invention generally relates to high pressure systems in rockets (e.g., rocket engines, oxidizer systems, propellant tanks) and, more particularly, to a vent system for such high pressure systems.

BACKGROUND OF THE INVENTION

Multi-stage rockets have long been used to propel various types a spacecraft into outer space, including satellites. One known multi-stage rocket configuration has an upper stage whose forward end is attached to the spacecraft and whose aft end is interconnected with a lower stage by an interstage adapter. Prior to separation of the lower stage from the upper stage during flight and also prior to ignition of the upper stage engine, a flow of rocket fuel into the upper stage engine is initiated. This flow of rocket fuel is directed out of the upper stage engine through an upper stage rocket engine vent system. The upper stage rocket engine vent system directs this rocket fuel overboard via an appropriate conduit that passes through an exterior wall of the rocket (e.g., on the interstage adapter).

The lower stage is separated from the upper stage rocket engine at the appropriate time during flight, and the upper stage rocket engine is also ignited at the appropriate time. Further travel will then be affected by the thrust provided by the upper stage rocket engine. One prior art protocol that ultimately leads to the separation of the upper stage from the spacecraft entails shutting down the upper stage rocket engine a number of times. That is, the upper stage rocket engine is shut down for a predetermined period of time, is thereafter ignited and run for a predetermined period of time, and is thereafter shut down once again. Fuel is discharged from the upper stage rocket engine through the upper stage rocket engine vent system under very high pressure each time that the upper stage rocket engine is shut down. One prior art configuration for this upper stage rocket engine fuel vent system uses a pair of about 2 inch diameter cylindrical ducts that are interconnected with the upper stage rocket engine. Both of these ducts extend out from the rocket engine at least generally perpendicular to the primary or longitudinal axis of the upper stage, and thereafter are directed rearwardly (e.g., in a generally L-shaped configuration). The thrust that is generated out of each these cylindrical vent ducts is on the order of about 600 pounds in one prior art embodiment. Thrusts of this magnitude cause relatively significant movement of the ducts relative to the upper stage rocket engine and introduces significant structural stresses at the interconnection with the upper stage rocket engine. There is a strong potential for damage to the upper stage rocket engine because of the stresses.

BRIEF SUMMARY OF THE INVENTION

The present invention generally relates to a system for reducing axial thrust for typically high pressure discharges. One particularly desirable application of the present invention is in a rocket engine vent system.

A first aspect of the present invention is embodied by a rocket that includes a spacecraft, as well a first or an upper stage that is interconnected with this spacecraft and that includes at least one rocket engine. A first or an upper stage rocket engine vent system is fluidly interconnected with this upper stage rocket engine (or any other rocket engine(s) associated with any other stage used by the rocket) and includes at least one first or upper stage rocket engine vent system conduit (hereafter a "first rocket engine vent system conduit"). A pair of vent apertures extend entirely through this first rocket engine vent system conduit. A first flow diverter that includes first and second vanes is disposed within this first rocket engine vent system conduit such that each vane projects at least generally toward its own vent aperture. Therefore, at least two separate and discrete fluid flows may be directed out of the first rocket engine vent system conduit.

Various refinements exist of the features noted in relation to the subject first aspect of the present invention. Further features may also be incorporated in the subject first aspect of the present invention as well. These refinements and additional features may exist individually or in any combination. The static pressure profile throughout the first rocket engine vent system conduit may be at least substantially unchanged (in relation to such a conduit that does not include the first flow diverter and vent apertures) by having the collective area of the two vent apertures (i.e., the sum of the surface area occupied by each of these vent apertures) be greater than the cross-sectional area of the first rocket engine vent system conduit (i.e., the area of the first rocket engine vent system conduit, taken perpendicular to a center reference axis about which the first rocket engine vent system conduit may be disposed). If a significant back pressure did develop in the first rocket engine vent system conduit, that is if the venting did not occur quickly enough such that this conduit (as well as the upper stage rocket engine) became overpressurized or such that the static pressure therein significantly increased, the upper stage rocket engine could be damaged. The pair of vent apertures are also preferably disposed in at least substantially opposing relation (e.g., 180 degrees apart), or stated another way on opposite sides of the first rocket vent system conduit. As such, two fluid flows may be directed out of the same first rocket engine vent system conduit in at least substantially opposite directions to at least substantially cancel any lateral thrust vectors that may be exerted on the first rocket engine vent system conduit. This also allows the fluid flows to be directed from the first rocket engine vent system conduit away from sensitive components or so as to otherwise reduce the potential for damaging other components of the rocket.

Axial thrusts to which the upper stage rocket engine is exposed during venting may be significantly reduced. In one embodiment, the end of the first rocket engine vent system conduit that is opposite that which interfaces with the upper stage rocket engine is closed. Stated another way, axial thrusts may be significantly reduced by having the projected area of the first and second vanes onto a plane perpendicular to a center reference axis about which the first rocket engine vent system conduit may be disposed, equal to the area of the first rocket engine vent system conduit defined by its diameter.

Multiple components may collectively define the first rocket engine vent system conduit associated with the subject first aspect. For instance, this first rocket engine vent system conduit may include a first conduit section having a first end that interfaces with the upper stage rocket engine. A separate first flow adapter may be separately interconnected with this first conduit section. The noted pair of vent apertures and the first flow diverter may be part of this first flow adapter. In one embodiment, the first flow adapter is attached to and extends beyond a second end of the first conduit section that is opposite the above-noted first end that interfaces with the upper stage rocket engine.

The first rocket engine vent system conduit may be disposed about a center reference axis and may include a pair of beveled surfaces. Each beveled surface may include one of the noted vent apertures. These beveled surfaces may be oriented on the first rocket engine vent system conduit so as to extend at least generally toward the noted center reference when progressing in a direction of a downstream end of the first rocket engine vent system conduit. In one embodiment, the pair of beveled surfaces are disposed in opposing relation, or stated another way, the beveled surfaces are spaced about 180 degrees apart. The beveled surfaces allow for increasing the surface area of the vent apertures for purposes of allowing adequate flow out of the first rocket engine vent system conduit.

The pair of vanes of the first flow diverter may direct two different fluid flows out of the same first rocket engine vent system conduit. Each fluid flow is directed through its own vent aperture (i.e., there is a one-to-one correspondence between the vanes of the first flow diverter and the vent apertures). Preferably, these fluid flows are at least substantially equal. Bifurcation of the fluid flow through the first rocket engine vent system conduit may be facilitated by configuring an upstream portion of the first flow diverter as an edge, and having the noted pair of vanes extend away from this edge at least generally away from a center reference axis about which the first rocket engine vent system conduit may be disposed. Configuring the upstream extreme of the first flow diverter as an edge also reduces the potential for the first flow diverter creating an undesirable back pressure within the first rocket engine vent system conduit.

Preferably the vanes extend at least generally away from a center reference axis about which the first rocket engine vent system conduit may be disposed to provide the desired flow diversion function. The vanes of the first flow diverter may be configured as arcuate surfaces to provide this flow diversion function. In one embodiment, each of the vanes of the first flow diverter is defined by a single radius. Other profiles may be appropriate for the vanes and which would still provide the desired flow diversion function and in a desired manner. For instance, the vanes may be an at least substantially planar surface (e.g., the first flow diverter could be wedge-shaped).

The first aspect may further include a second stage that is interconnected with the upper stage on an opposite end thereof in relation to the spacecraft, and further that includes at least one rocket engine. The upper stage rocket engine vent system may be configured so as to be able to discharge flows from the upper stage rocket engine even when the upper stage remains interconnected with the second stage, typically via an interstage adapter. In this regard, the first rocket engine vent system conduit may include first and second legs. The first leg may be structurally interconnected with the upper stage and may incorporate the noted pair of vent apertures and the first flow diverter. The second leg may be structurally interconnected with the second stage or an interstage adapter, and further may be disposed over the first leg when the second stage is interconnected with the upper stage. As such, any fluid flow that is directed out of the pair of vent apertures in the first leg is directed into the corresponding second leg when the second stage is interconnected with the upper stage. The second leg extends through an outer wall of the second stage or more typically an interstage adapter to direct any such fluid flow overboard. Preferably, the second leg is slidably interconnected with the first leg such that when the second stage separates from the upper stage, the second leg is simply "pulled off" its corresponding first leg such that the upper stage rocket engine vent system still may be used to discharge rocket fuel from the upper stage rocket engine. That is, the upper leg will remain structurally interconnected with the upper stage, and the "pulling off" of the second leg from the first leg will expose the noted pair of vent apertures such that rocket fuel may be discharged directly into outer space during flight.

A second aspect of the present invention is embodied by a rocket that includes a spacecraft, as well as an upper stage that is interconnected with this spacecraft and that includes at least one rocket engine. An upper stage rocket engine vent system is fluidly interconnected with this upper stage rocket engine and includes at least one rocket engine vent system conduit (hereafter a "first rocket engine vent system conduit"). This first rocket engine vent system conduit includes appropriate structure for directing a first fluid flow out of the first rocket engine vent conduit in a first direction that is disposed at an angle relative to a center reference axis about which the first rocket engine vent system conduit is disposed (e.g., at least generally transverse to such a center reference axis).

Various refinements exist of the features noted in relation to the subject second aspect of the present invention. Further features may also be incorporated in the subject second aspect of the present invention as well. These refinements and additional features may exist individually TS or in any combination. The first rocket engine vent system conduit may further include structure for directing a second fluid flow out of this conduit in a second direction that is also disposed at an angle relative to the center reference axis about which the first rocket engine vent system conduit is disposed, preferably simultaneously with the above-noted first fluid flow. More preferably, the first and second fluid flows are at least generally directly opposite each other to significantly reduce the lateral thrust to which the first rocket engine vent system is exposed during venting operations.

A third aspect of the present invention relates to a vent system for a high pressure system. The system includes a high pressure source and a vent system that is fluidly interconnected therewith. This vent system includes a first vent system conduit. A plurality of vent apertures extend entirely through this first vent system conduit. A first flow diverter is disposed within this first vent system conduit so as to direct a fluid flow that is progressing through the first vent system conduit in a radially outward direction (i.e., at least generally away from a center reference axis about which the first vent system conduit is disposed) toward the plurality of vent apertures when the first flow diverter is encountered by this fluid flow.

Various refinements exist of the features noted in relation to the subject third aspect of the present invention. Further features may also be incorporated in the subject third aspect of the present invention as well. These refinements and additional features may exist individually or in any combination. Initially, the various features of the subject third aspect may be used by both the first and second aspects discussed above. The static pressure profile throughout the first vent system conduit may be at least substantially unchanged (in relation to such a conduit that does not include the first flow diverter and vent apertures) by having the collective area of the plurality of vent apertures (i.e., the surface area occupied by these vent apertures) be greater than the cross-sectional area of the first vent system conduit (i.e., the area of the first vent system conduit, taken perpendicular to a center reference axis about which the first vent system conduit may be disposed). If a significant back pressure did develop in the first vent system conduit, that is if the venting did not occur quickly enough such that this conduit (as well as the high pressure source fluidly interconnected therewith) became overpressurized or such that the static pressure therein significantly increased, one or more components of the high pressure system could become damaged. Reduction of the lateral thrust to which the first vent system conduit may be exposed during a venting of the high pressure source may be realized by disposing the plurality of vent apertures about the first vent system conduit in at least substantially equally spaced relation, or by disposing the plurality of vent apertures in symmetrical fashion on the first vent system conduit.

Multiple and discrete surfaces may be utilized by the first flow diverter for diverting the fluid flow to the plurality of vent apertures. Each discrete surface may be associated with its own vent aperture, or a single discrete surface of the first flow diverter may be associated with a plurality of vent apertures. The first flow diverter may also be in the form of a single, continuous surface. For instance, the first flow diverter may be in the form of a cone or the like, with the vertex of the cone being disposed so as to project upstream.

Diversion of the fluid flow toward the plurality of vent apertures may be affected by configuring the first flow diverter so as to extend at least generally away from a center reference axis about which the first vent system conduit may be disposed in a direction of the flow through the first vent system conduit. The first flow diverter may also actually separate the fluid flow into a plurality of separate and discrete fluid flows.

A fourth aspect of the present invention is embodied by a multiple stage rocket. Each stage of the rocket includes at least one rocket engine. A first vent system is fluidly interconnected with a high pressure source (e.g., rocket engine, oxidizer system, propellant tank) that is associated with a first stage of the rocket. This first vent system includes a first leg that is fluidly interconnected with this high pressure source, and further that is physically interconnected with the first stage. Multiple vent apertures are provided on the first leg so as to direct a plurality of fluid flows in an at least generally radially outward direction relative to a center axis about which the first leg is disposed. A second leg of the vent system is fluidly interconnected with the first leg, and is physically interconnected with a second stage of the rocket or some interconnecting structure between the first and second stages (e.g., an interstage adapter). While the second stage is interconnected with the first stage, venting of the high pressure source is directed out of the second leg. The resultant fluid flow from this venting may flow through the first leg and then into the second leg. After the second stage has separated from the first stage and as the first stage continues to progress through outer space, venting of the high pressure source is directed out of the first leg and the noted plurality of vent apertures directly into outer space. Those features discussed above in relation to the first aspect of the present invention may be utilized by this fourth aspect of the invention and in any combination.

DETAILED DESCRIPTION OF THE INVENTION

Figure 1:
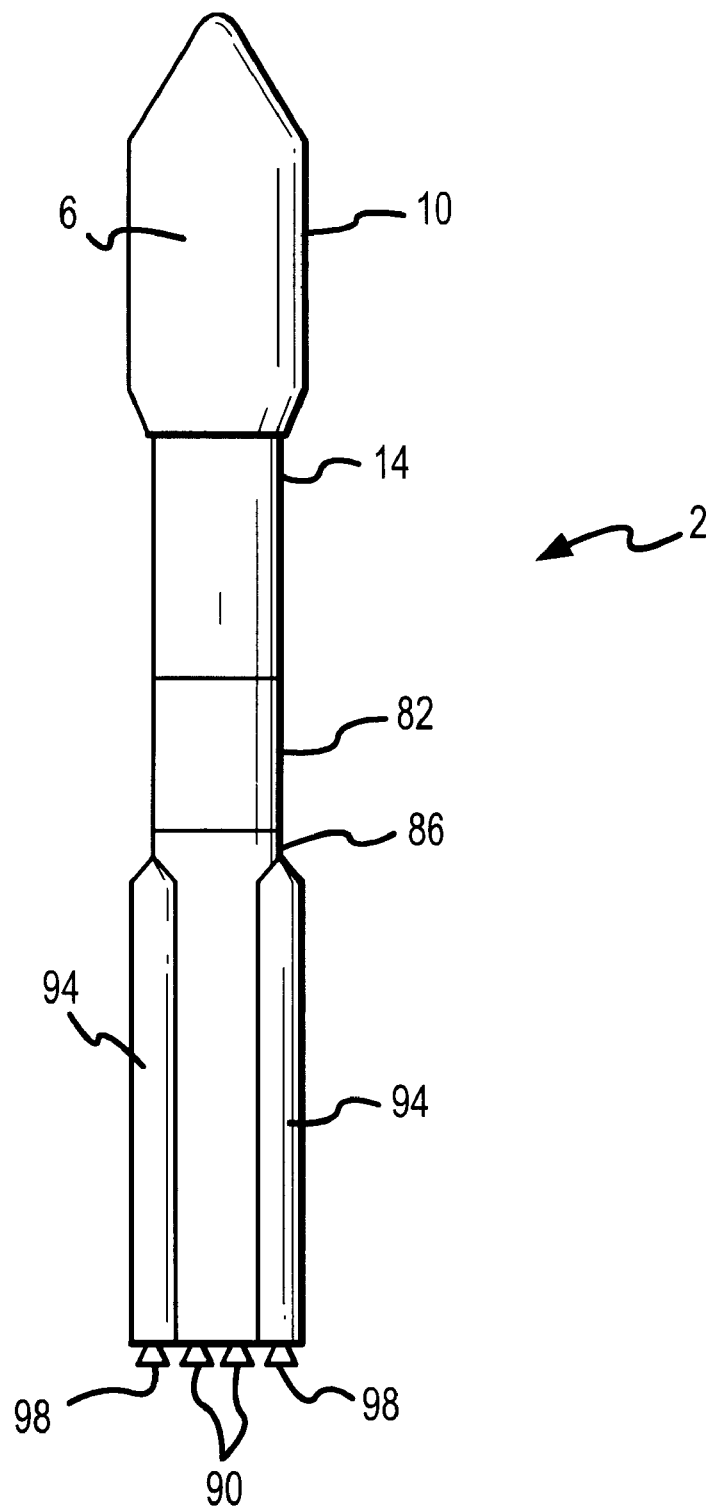
FIG. 1 is a side view of one embodiment of a rocket.

The present invention will now be described in relation to the accompanying drawings which at least assist in illustrating its various pertinent features. FIG. 1 illustrates one embodiment of a rocket 2. The rocket 2 generally includes an outer shell or payload fairing 6. Multiple and separable sections define the rocket 2. These sections include a spacecraft 10 (e.g., a satellite) that is interconnected with one end of an upper or second stage 14, and a lower or first/booster stage 86 that is interconnected with the opposite end of the upper stage 14 by an interstage adapter 82. The lower stage 86 includes one or more rocket engines that are used during the initial portion of a flight and whose exhaust is directed out of one or more lower stage rocket engine nozzles 90 that are disposed on the lower portion of the lower stage 86 and that may be characterized as being part of the lower stage rocket engine. Additional thrust for lift off is provided by a plurality of solid rockets 94 that are appropriately detachably mounted on the lower stage 86 and whose exhaust is directed out of one or more solid rocket nozzles 98. The embodiment of the rocket 2 illustrated in FIG. 1 is merely but one rocket configuration which may utilize principles of the present invention.

Figure 2:
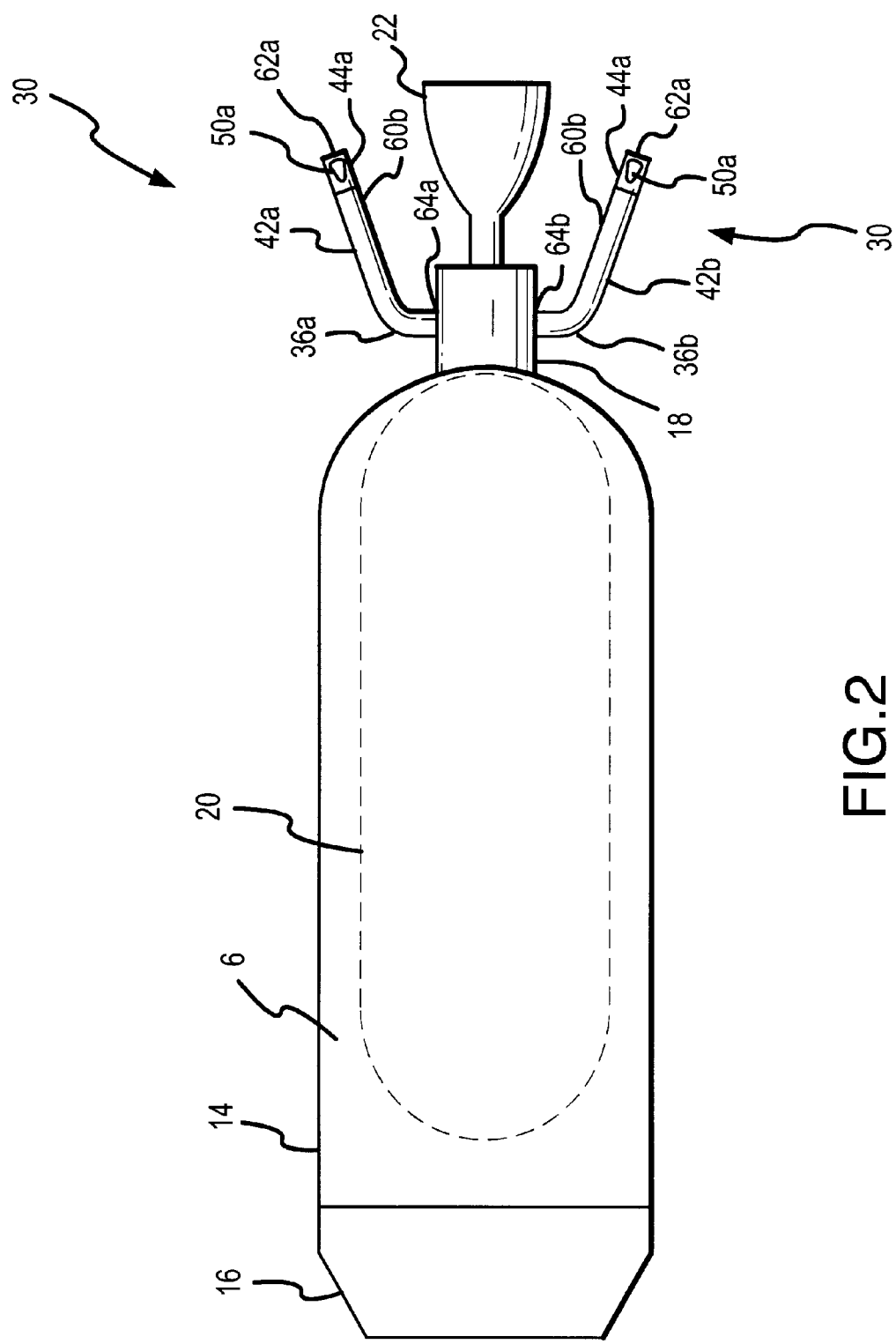
FIG. 2 is a schematic side view of the upper stage of the rocket of FIG. 1, without the spacecraft or second stage interconnected therewith and which illustrates a pair of upper legs of an upper stage rocket engine vent system.
Figure 3:
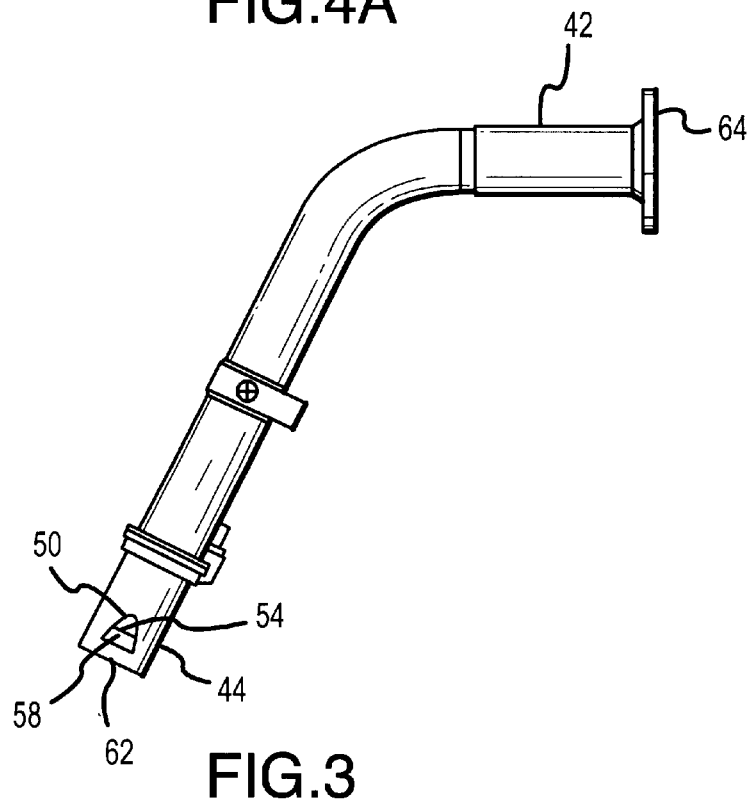
FIG. 3 is a side view of one of the upper legs of the upper stage rocket engine vent system illustrated in FIG. 2.

FIG. 2 schematically illustrates that the upper stage 14 of the rocket 2 includes one or more rocket engines 18 for propelling the upper stage 14 and the spacecraft 10 interconnected therewith after the same have separated from the interstage adapter 82 and the lower stage 86. The upper stage rocket engine(s) 18 provides propulsion forces that are directed out of a rocket engine exhaust 22 after the upper stage 14 has separated from both the interstage adapter 82 and the lower stage 86. The spacecraft 10 would still be interconnected with the upper stage 14 at this time via a spacecraft adapter 16 on the upper end of the upper stage 14. Rocket fuel must be vented or discharged from the rocket engine(s) 18 after the upper stage 14 has separated from the interstage adapter 82 and the lower stage 86, namely each time that the rocket engine(s) 18 is shut down prior to separation of the spacecraft 10 from the upper stage 14. These are relatively high pressure discharges, and therefore the rocket engine(s) 18 may be characterized as a high pressure source in a high pressure system. Rocket fuel is also directed into the upper stage rocket engine(s) 18 at one or more times prior to the separation of the upper stage 14 from the interstage adapter 82 and the lower stage 86, as well as prior to the initial ignition of the upper stage rocket engine(s) 18. This rocket fuel must also be appropriately directed overboard. Gases (e.g., helium) may also be directed through the upper stage rocket engine(s) 18 in preparation for liftoff of the rocket 2 (e.g., while on the launch pad), which must also be appropriately directed overboard. As such, the rocket 2 includes an upper stage rocket engine vent system 30 that is fluidly interconnected with the upper stage rocket engine(s) 18. The portion of the upper stage rocket engine vent system 30 that is used to vent the upper stage rocket engine(s) (18) after the first stage 14 has separated from the interstage adapter 82 and the lower stage 86 is generally illustrated in FIG. 2. Those portions of the upper stage rocket engine vent system 30 that are used to vent the upper stage rocket engine(s) 18 while the upper stage 14 remains interconnected with the interstage adapter 82 and the lower stage 86 will be discussed in more detail below in relation to FIGS. 6A–B.

The upper stage rocket vent system 30 generally includes at least one and typically a plurality of upper legs 42 that are associated/interconnected with the upper stage 14, and that are illustrated in FIGS. 3 and 4A–D in addition to FIG. 2. These upper legs 42 function as a conduit for the upper stage rocket engine vent system 30. Two upper legs 42 are used by the illustrated embodiment. Any appropriate number of upper legs 42 may be utilized by the upper stage rocket engine vent system 30. The number of upper legs 42 may be selected depending upon the requirements of the application that is to utilize the high pressure venting system discussed herein. Only one of the upper legs 42 will be described herein since each upper leg 42 will preferably use the same construction in the case of the upper stage rocket engine vent system 30.

One end 64 of the upper leg 42 of the upper stage rocket engine vent system 30 is fluidly interconnected with the rocket engine 18 at an appropriate location (FIG. 2), while its opposite end 62 is free such that the upper leg 42 may be characterized as a cantilever of sorts. There are two main components of the upper leg 42 in the illustrated embodiment, namely a conduit section 60 and a flow adapter 44. Typically these will be separate components and appropriately interconnected (e.g., by welding), although any construction which provides the functionality of the flow adapter 44 to be described herein may be utilized as well for the illustrated application and any other suitable application.

Certain features of the flow adapter 44 significantly reduce the thrust to which the rocket engine 18 is exposed when rocket fuel is vented/discharged out of the upper stage rocket engine vent system 30 through the upper leg 42. The flow adapter 44 includes a sidewall 46 that is disposed about a center reference axis 68 (e.g., FIG. 4B). The conduit section 60 may be characterized as being disposed about this same center reference axis 68 as well. In one embodiment, the sidewall 46 is cylindrical for interfacing with a cylindrical conduit section 60 or an appropriate interconnecting fitting. In the illustrated application, the inner diameter of the flow adapter 44 is at least substantially the same as the inner diameter of the conduit section 60 so as to not cause a disruption in the various flows that may pass through the upper stage rocket engine vent system 30 by introducing the flow adapter 44.

A pair of beveled surfaces 52 are disposed on at least generally opposite sides of the sidewall 46 so as to be disposed in at least generally opposing relation (e.g., 180 degrees apart). Preferably the beveled surfaces 52 are the mirror image of each other. Each beveled surface 52 extends at least generally toward the center reference axis 68 progressing toward the closed end 62 of the upper leg 42, which is defined in the illustrated embodiment by the lower or downstream extreme of the flow adapter 44. Stated another way, the beveled surfaces 52 are disposed at an angle relative to the center reference axis 68 or a line parallel therewith. This may be represented by the angle $A_1$, which in one embodiment is within a range of about 10 degrees to about 20 degrees. The beveled surfaces 52 terminate prior to reaching an end of the sidewall 46 so as to leave a lip 43.

The illustrated application of the present invention benefits from there being only two beveled surfaces 52. Other applications where thrust reduction may be desirable may benefit from having more than two beveled surfaces 52. Still, the beveled surfaces 52 would likely be disposed in equally spaced relation about the center reference axis 68 when used in these other possible applications. Other applications that may utilize the thrust reducing principles of the high pressure vent system disclosed herein may not require the use of any beveled surfaces 52.

A vent aperture 50 is disposed on each beveled surface 52. As such and for the illustrated application, the flow adaptor 44 includes a pair of vent apertures 50 that are also thereby disposed in at least generally opposing relation (e.g., disposed 180 degrees apart). In one embodiment, the collective surface area taken up by this pair of vent apertures 50 is greater than the area of the open end 48 of the flow adapter 44, as well as the area of the conduit section 60 defined by its inner diameter (i.e., both being taken perpendicular to the center reference axis 68). This allows for the pressure distribution within the conduit section 60 to be unaltered by the addition of the flow adapter 44. The beveled surfaces 52 allow the collective area of only two vent apertures 50 to be greater than the area of the open end 48 of the flow adapter 44, as well as the area of the conduit section 60 defined by its inner diameter (i.e., both taken perpendicular to the center axis 68). Other applications may allow for the use of more than two vent apertures 50. In these instances, it may not be necessary to form the beveled surfaces 52 on the sidewall 46 of the flow adapter 44 to realize the desired total surface area of the vent apertures 50 to maintain a desired static pressure.

Flow is directed out of each of the noted vent apertures 50 by a diverter 54 during a venting of the upper stage rocket engine(s) 18. The flow diverter 54 is disposed within the flow adapter 44 to direct at least substantially equal flows of rocket fuel or other fluids out of the vent apertures 50. Since the vent apertures 50 are disposed in at least generally opposing relation, these two flows are thereby directed out of the flow adaptor 44 in at least generally opposite directions.

The diverter 54 includes a pair of varies 58 that are disposed in at least generally opposing relation for the illustrated application (e.g., disposed about 180 degrees apart; projecting at least generally away from each other), and that are preferably the mirror image of each other. Each vane 58 at least generally projects towards one of the vent apertures 50 and extends at least generally away from the center reference axis 68 progressing in the direction of the closed end 62 of the upper leg 42. Each of these vanes 58 is an at least substantially arcuate surface in the illustrated embodiment, and in one embodiment each vane 58 is defined by a single radius. In one embodiment where the inner diameter of the flow adaptor 44 is two inches, both vanes 58 may be defined by an arcuate surface having a one inch radius. Other profiles may be appropriate for each of the vanes 58 (e.g., a planar surface, a compound radius, a conical surface). In any case, the vanes 58 preferably intersect at a peak 56 at the upstream extreme of the flow diverter 54 so as to not induce an significant back pressure. Any configuration that will not induce a significant back pressure may be appropriate (e.g., a vertex of a cone-shaped flow diverter 54). In the illustrated embodiment, the peak 56 is in the form of a line or an edge, and is disposed on the center reference axis 68 so as to bifurcate the flow through the flow adapter 44. The peak 56 of the diverter 54 is located closer to the closed end 62 of the upper leg 42 than those portions of the vent apertures 50 that are disposed closest to the open end 48 of the flow adapter 44. Stated another way, the peak 56 of the diverter 54 is spaced along the center reference axis 68 from the upstream extreme of the vent apertures 50, and which is represented by the distance "d" in FIG. 4C. The peak 56 may be disposed at different elevations within the flow adapter 44 and still provide the desired flow-diverting functionality.

One way to make the flow adapter 44 is to select an appropriately sized piece of tubing, and machine the beveled surfaces 52 thereon. Alternatively, the beveled surfaces 52 could be formed directly on an end portion of the conduit section 60. In any case, the flow 54 diverter may be formed into the desired configuration, inserted through one of the open ends of the piece of tubing that now includes the two vent apertures 50, and then appropriately secured thereto (e.g., via welding). In one embodiment where the flow adapter 44 has an inner diameter of about 1.9 inches and an outer diameter of about 2.0 inches, a 2 inch piece of solid cylindrical bar may be machined to define a 1 inch radius on opposing sides thereof. The solid cylindrical bar may be cut an appropriate distance from the lower extreme of these two surfaces to define the closed end 62 when the flow diverter 54 is appropriately installed.

Figure 4A:
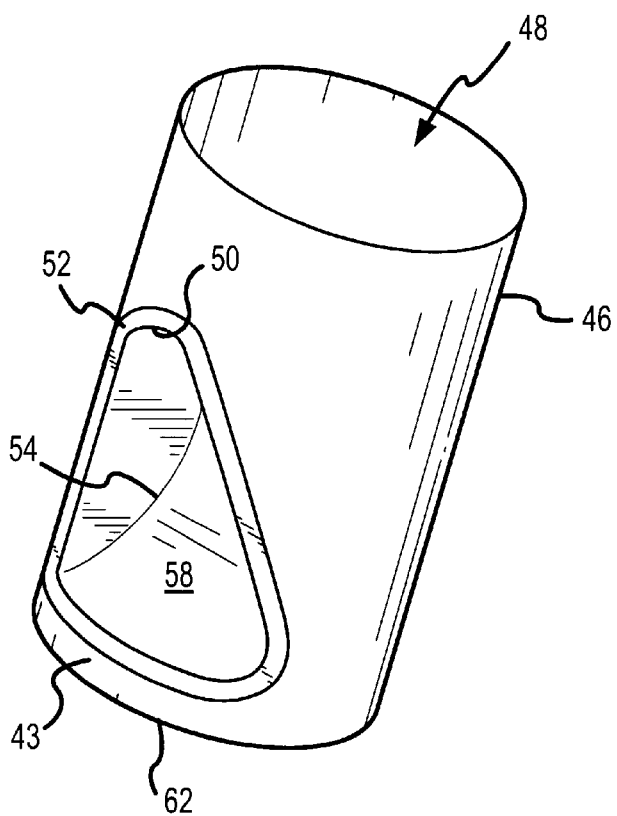
FIG. 4A is a perspective view of a flow adapter disposed in each upper leg of the upper stage rocket engine vent system illustrated in FIG. 2.
Figure 4B:
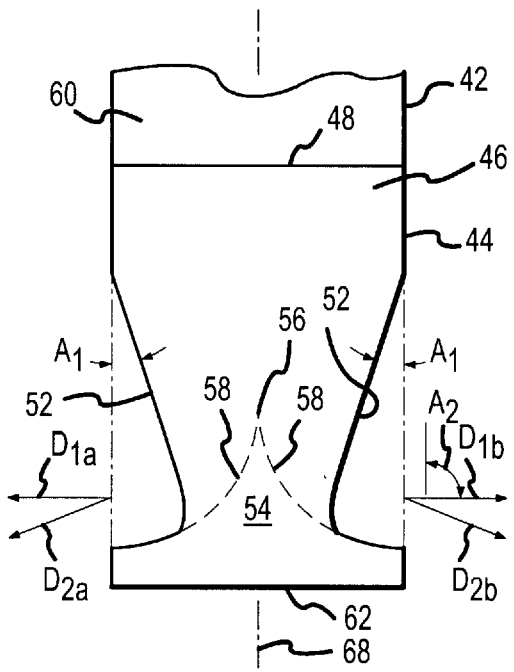
FIG. 4B is a side view of the flow adapter of FIG. 4A, which shows the opposing relation of a pair of beveled surfaces that each include a vent aperture.
Figure 4C:
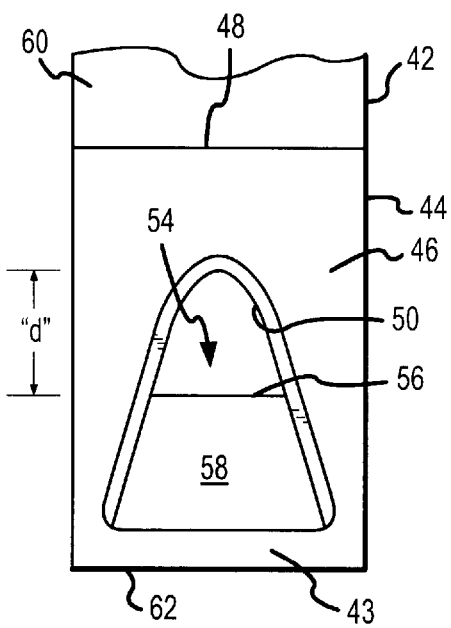
FIG. 4C is another side view of the flow adapter of FIG. 4A, which shows one of its vent apertures in plan view.
Figure 4D:
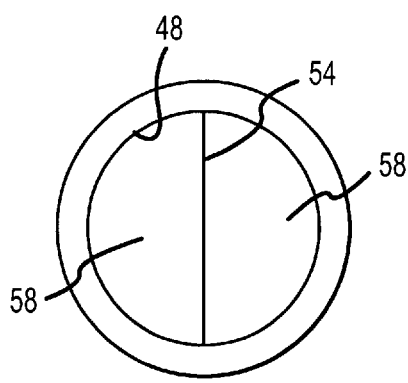
FIG. 4D is a plan view of the flow adapter of FIG. 4A looking down into its open end.

It should be appreciated that the flow adapter 44 as described will direct two at least substantially equal flows out of the upper leg 42 in at least substantially opposite directions. Preferably, both of these flows are directed out of the flow adapter 44 at least generally transverse to the direction of the fluid flow (i.e., along the center reference axis 68) down through the conduit section 60 and as it enters flow adapter 44 (i.e., at least generally transverse to the center reference axis 68). Arrows $D_{1a}$ and $D_{1b}$ in FIG. 4B are disposed perpendicular to the center reference axis 68. Although the fluid flow could be directed out of the flow adapter 44 in the direction represented by the arrows $D_{1a}$ and $D_{1b}$, more typically the fluid flow will be directed out of the flow adapter 44 so as to retain a small aft or rearwardly directed component in the direction of the two fluid flows. This is depicted by the arrows $D_{2a}$ and $D_{2b}$ in FIG. 4B. In one embodiment, both fluid flows are directed out of the flow adapter 44 at an angle $A_2$ that is measured relative to the center reference axis 68 (or a line parallel thereto), and further that is preferably within a range of about 100 degrees to about 145 degrees to provide a desired degree of axial thrust reduction.

Figure 5:
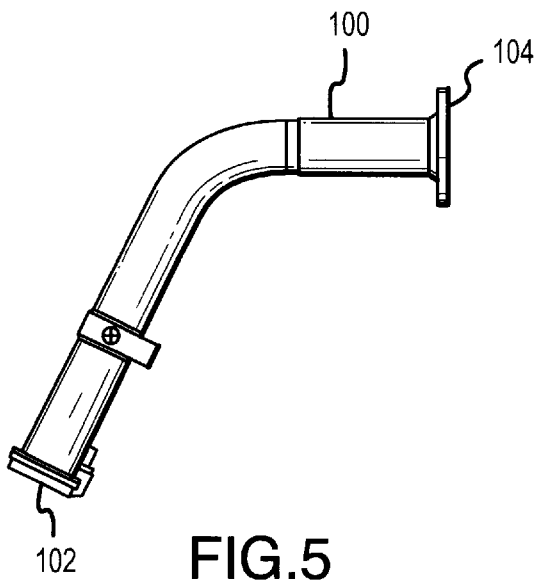
FIG. 5 is a prior art rocket engine vent conduit.

Rocket fuel may be vented or discharged out of each upper leg 42 of the upper stage rocket engine vent system 30 after the upper stage 14 has separated from both the interstage adapter 82 and the lower stage 86. This will typically be done each time the rocket engine(s) 18 is shut down prior to the separation of the spacecraft 10 from the upper stage 14 (and after the spacecraft 10 and upper stage 14 have separated from both the interstage adapter 82 and the lower stage 86). This will typically be a two-phase (e.g., liquid/ gaseous hydrogen), relatively high pressure (e.g., about 1500 psi), and short duration (e.g., less than about 1 second for the entire thrust event, with the peak thrust event occurring at about 50 milliseconds) event. In one embodiment, the axial thrust when executing such a discharge out of the upper leg 42 was only about 170 pounds as a result of the features utilized by the flow adapter 44. For purposes of comparison, consider the design that is illustrated in FIG. 5 and that is within the prior art for venting a rocket engine. The conduit 100 is similarly dimensioned and configured to the conduit section 60. When an end 104 of the conduit 100 is interconnected with a rocket engine, and when discharging rocket fuel out through this open end 102 of the conduit 100 under similar conditions to those noted above in relation to the flow adapter 44, the axial thrust was more on the order of about 600 pounds. Axial thrusts of this level caused significant movement of the conduit 100, which could possibly result in structural damage to the rocket engine interconnected therewith.

There may be a need to discharge rocket fuel or other fluids overboard prior to the separation of the interstage adapter 82 and lower stage 86 from the upper stage 14. In this regard and referring to FIGS. 6A–B, the upper stage rocket engine vent system 30 further includes a lower leg 74 for each upper leg 42. Each lower leg 74/upper leg 42 pair may be characterized as a vent leg 36, and the upper rocket engine vent system 30 may include one or more of these vent legs 36 which may collectively be characterized as a vent conduit assembly 34. Whereas each upper leg 42 is associated/interconnected with the upper stage 14, each lower leg 74 is associated/interconnected with the interstage adapter 82 (or possibly in the lower stage 86). In one embodiment, one end 72a of each lower leg 74 extends through the interstage adapter 82, while its opposite end 72b is disposed over an aft or lower portion of its corresponding upper leg 42 that includes the flow adapter 44. A plurality of fuel vent legs 36 could also have their corresponding lower leg 74 fluidly interconnected with a common manifold or the like so as to allow for only a single penetration of the interstage adapter 82 by the upper stage rocket engine vent system 30 (not shown).

One or more seals 70 are provided between an outer diameter 66 of each upper leg 42 and the inner diameter 78 of its corresponding lower leg 74 such that a corresponding flow adapter 44 is disposed downstream of these seals 70 when the upper stage 14 is still interconnected with the interstage adapter 82 and the lower stage 86. That is, the seals 70 are located between the end 72b of the subject lower leg 74 and the flow adapter 44 of the corresponding upper leg 42 at this time. These seals 70 allow for a fluid flow to be directed overboard prior to separation of the interstage adapter 82 and lower stage 86 from the upper stage 14. In this regard, a high pressure relief valve 38 of the upper stage rocket engine vent system 30 will be opened to initiate a flow into each of the upper legs 42. There will typically be one high pressure relief valve 38 for each upper leg 42, and the same are used to control all venting operations by the upper stage rocket engine vent system 30. However, it may be possible to use a single high pressure relief valve 38 for multiple vent legs 36.

Each upper leg 42 will introduce two fluid flows into its corresponding lower leg 74 at a location that is downstream of its corresponding seals 70. The seals 70 at least substantially prevent these fluids from flowing thereby, such that the fluids will be forced to flow down through the corresponding lower leg 74 and out its open end 72a, or overboard from the rocket 2. In one embodiment, this pair of fluid flows from a given flow adapter 44 is introduced into a section 76 of the lower leg 74 which is "enlarged" in relation to more "downstream" portions of the lower leg 74. This enlarged section 76 also extends both upstream and downstream of the vent apertures 50. Generally, the area of the annular space that is disposed between the portion of the upper leg 42 that includes the vent apertures 50 and the enlarged section 76 of the lower leg 74 (taken perpendicularly to the flow), namely that space into which the two fluid flows from the upper leg 42 are introduced into the lower leg 74, should be greater than the minimum area of any upstream components of the vent system 30 (again, taken perpendicularly to the fluid flow) so as to not "choke" or reduce the fluid flow through the vent system 30.

There will be a certain amount of movement of the upper stage rocket engine 18 while the upper stage 14 is still interconnected with the interstage adapter 82 and the lower stage 86 (and therefore while the upper leg 42 of the rocket engine vent system 30 is still fluidly interconnected with its corresponding lower leg 74). The vent system 30 accommodates these movements and does so in a manner so as to not significantly adversely affect the flow characteristics through the vent system 30 and/or the ability for the lower leg 74 to be pulled off of its corresponding upper leg 42 in an at least substantially non-binding manner. In this regard, the vent system 30 includes at least one, and more preferably at least two, bellows 80 that are disposed within the vent leg 36 (in the lower leg 74 in the illustrated embodiment). Movements of the upper stage rocket engine 18 that are translated to the upper leg 42 of the vent system 30 should still allow that portion of the corresponding lower leg 74 that is disposed over this upper leg 42 to remain at least substantially parallel with the same. There may also be a degree of relative axial movement between the upper leg 42 and its corresponding lower leg 74 during movement of the upper stage rocket engine 18 as well. Therefore, length of the enlarged section 76 of the lower leg 74 should be selected so as to accommodate this relative axial movement (i.e. so that the discharge from the upper leg 42 will still be into the enlarged section 76 of the lower leg 74, regardless of the degree of movement of the engine 18).

Figure 6A:
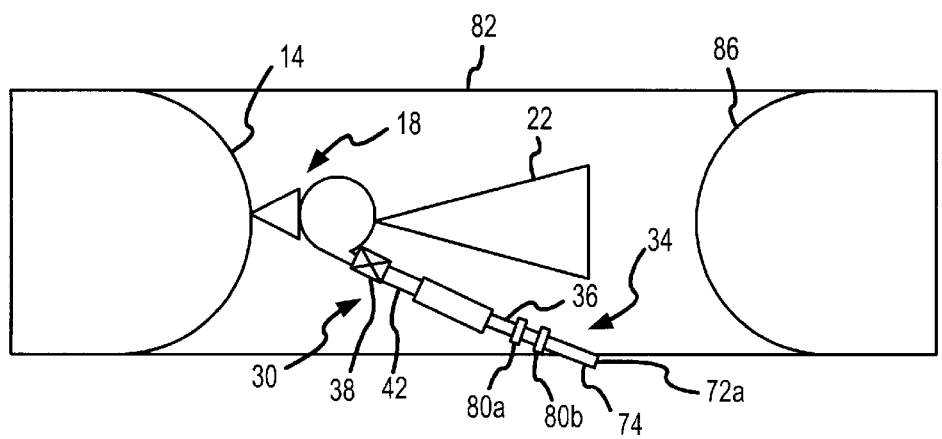
FIG. 6A is a schematic side view of an interconnection of the upper stage, interstage adapter, and lower stage of the rocket of FIG. 1, as well as an interconnection of one of the upper legs of the upper stage rocket engine vent system illustrated in FIG. 2 with a lower leg of such a vent system that collectively define a vent leg to allow for overboard discharges when the upper stage, interstage adapter, and lower stage are interconnected.
Figure 6B:
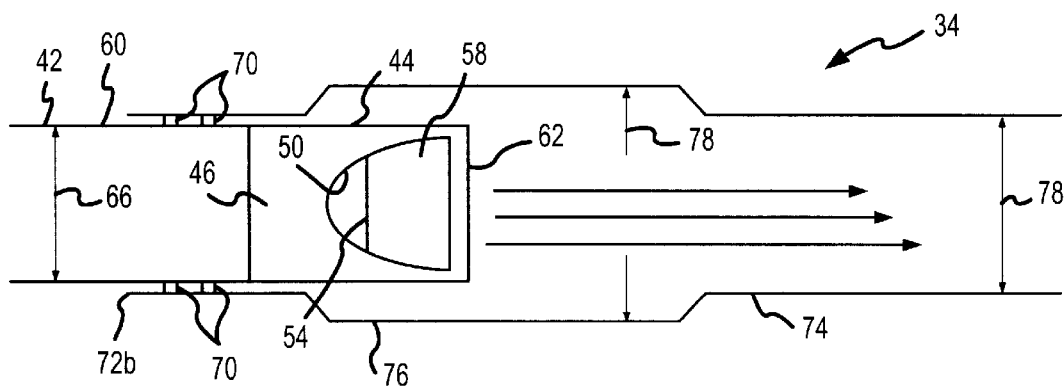
FIG. 6B is an enlarged, schematic side view of the slidable interconnection of the upper and lower legs of one of the vent legs for the upper stage rocket engine vent system of FIG. 6A.
Figure 7:
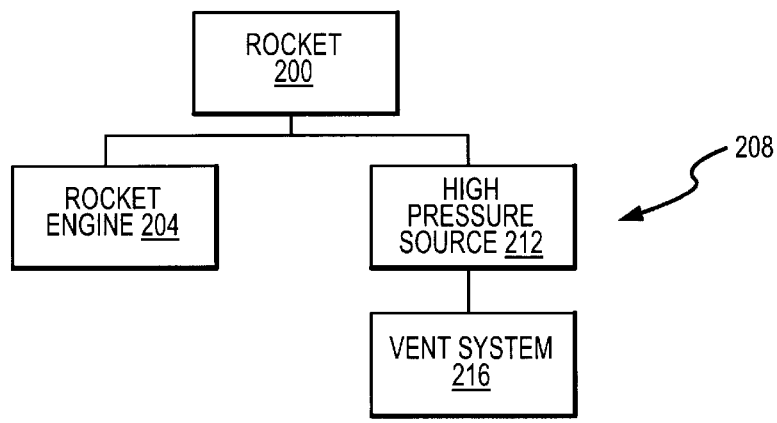
FIG. 7 is a schematic of a rocket with a high pressure fluid system that includes a vent system at least generally of the type used to vent the upper stage rocket engine and as illustrated in FIGS. 2, 4A–C, and 6A–B.

FIGS. 6A–B present a configuration to allow rocket fuel or other fluids (e.g., helium gas) to be vented overboard when the upper stage 14 is still interconnected with the interstage adapter 82 and the lower stage 86 as noted. This configuration also allows rocket fuel to be vented overboard after the upper stage 14 has separated from the interstage adapter 82 and the lower stage 86. Generally, when the interstage adapter 82 and lower stage 86 are released from the upper stage 14 during flight, each lower leg 74 of the upper stage rocket engine vent system 30 is pulled or slides off its corresponding upper leg 42 so as to expose the vent apertures 50 to outer space (e.g., FIG. 2). Again, the lower legs 74 are structurally interconnected with the interstage adapter 82. Thereafter, the high pressure relief valve 38 may be activated when it is again desirable to vent or discharge rocket fuel or other fluids from the upper stage rocket engine 18. It should be appreciated that certain applications will not require venting under the multiple types of conditions that are accommodated by the upper stage rocket engine vent system 30. The entirety of the high pressure venting system may simply be one or more of the above-noted upper legs 42 in these types of instances.

The illustrated application benefits from using only two vent apertures 50 for thrust reducing purposes. Other applications of the high pressure vent system disclosed herein may benefit from having three or more vent apertures 50 (not shown). It is believed that these vent apertures 50 would still be equally spaced about the center reference axis of the corresponding vent conduit, or at least symmetrically disposed about this center reference axis. In this case, the flow adapter 54 could include a corresponding number of vanes 58 such that each would direct in effect a separate and discrete flow out of the flow adapter 44 through its own vent aperture or set of vent apertures 50. However, it may be possible to configure the flow diverter 54 in the form of a cone or the like (e.g., a continuous surface) which would extend within the interior of the flow adapter 44 so as to have the cone vertex project upstream or into the oncoming flow. This type of flow diverter 54 would direct the entirety of the flow in an at least generally radially outward direction toward and through a plurality of vent apertures 50.

The above-described rocket engine vent system 30 may be utilized in conjunction with other high pressure systems on rockets. FIG. 8 schematically illustrates a rocket 200 that includes at least one rocket engine 204 and a high pressure system 208. This high pressure system 208 includes a high pressure source 212 and a vent system 216 that is fluidly interconnected therewith. Representative examples of the high pressure system 208 for the rocket 200 include oxidizer systems, propellant tanks, and the like. This high pressure system 208 may interface with or actually be part of the rocket engine 204, although such is not required. The vent system 216 may include the upper leg 42 of the rocket engine vent system 30, alone or in combination with the lower leg 74, depending upon the requirements of the particular application (e.g., the time(s) at which venting is required and any related staging requirements).

Figure 8A:
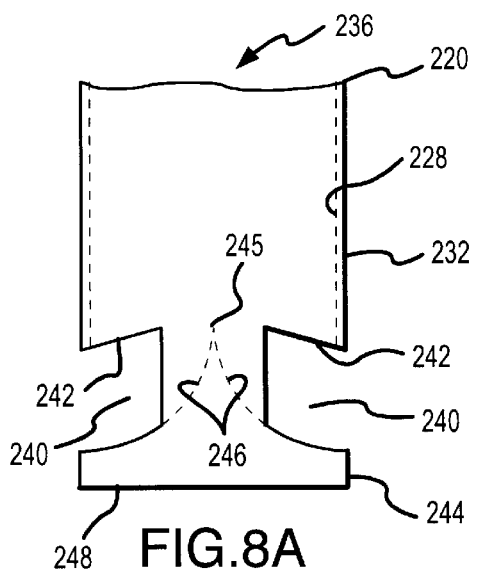
FIG. 8A is a side view of an alternative embodiment of a flow adapter that may be disposed in a vent leg of a single phase, high pressure vent system, where the vent apertures have been optimized for thrust reduction.
Figure 8B:
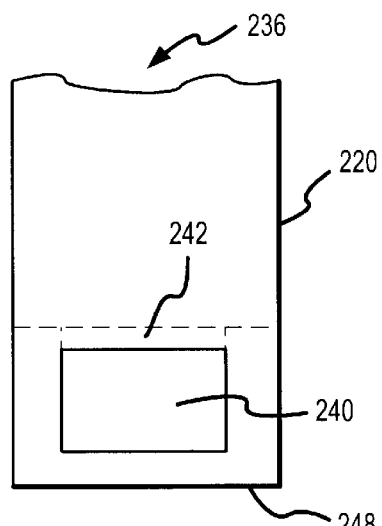
FIG. 8B is a side view of the flow adapter of FIG. 8A.
Figure 8C:
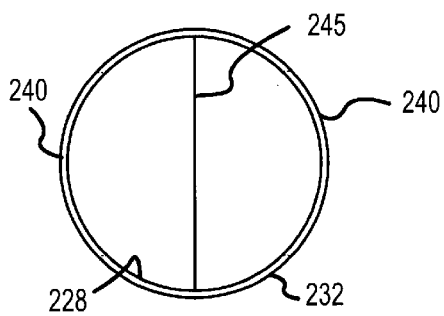
FIG. 8C is a view looking down into the open end of the flow adapter of FIG. 8A.

Only a single phase fluid may need to be vented by the vent system 216 in certain applications. In this regard, the flow adapter utilized by the vent system 216 may be optimized to further reduce the axial thrust. FIGS. 8A–C illustrate one embodiment of such an optimized flow adapter 220 for venting a high pressure gas at sonic or supersonic rates. The flow adapter 220 includes an inner wall 228 and an outer wall 236. A pair of vent apertures 240 extend from the inner wall 228 to the outer wall 232, and are preferably disposed in equally spaced relation (e.g., 180 degrees apart in the illustrated embodiment). A flow diverter 244 having a pair of vanes 246 is disposed within the flow adapter 220 and defines a closed end 248. Each vane 246 directs a flow toward one of the vent apertures 240 by projecting at least generally toward its corresponding vent aperture 240.

The geometry of the flow diverter 244 and vent apertures 240 may be shaped to create an oblique shockwave that starts at the peak 245 of the flow diverter 244 and that attaches to an upper edge 242 of the corresponding vent aperture 240. This creates a large pressure drop across the shock wave on the downstream side of the shockwaves, and lowers the fluid velocity. Lowering the fluid velocity further reduces the axial thrust by reducing the momentum/velocity term in the thrust equation.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A rocket, comprising:
   a spacecraft;
   an upper stage interconnected with said spacecraft and comprising an upper stage rocket engine; and
   an upper stage rocket engine vent system fluidly interconnected with said upper stage rocket engine and comprising a first rocket engine vent system conduit, wherein said first rocket engine vent system conduit comprises first and second vent apertures that extend entirely through a wall thickness of a first conduit section of said first rocket engine vent system conduit, as well as a first flow diverter that is disposed within said first conduit section, wherein said first flow diverter comprises first and second vanes that are disposed within said first conduit section and that project toward said first and second vent apertures, respectively.

2. The rocket of claim 1, wherein:
   said first and second vent apertures are disposed in opposing relation.

3. The rocket of claim 1, wherein:
   said first rocket engine vent system conduit comprises a second conduit section and a separate first flow adapter that is interconnected with said conduit section, wherein said first flow adapter comprises said first conduit section and said first flow diverter.

4. The rocket of claim 3, wherein:
   said first conduit section comprises first and second ends, wherein said first end is interconnected with said upper stage rocket engine, wherein said second end is spaced from said upper stage rocket engine, and wherein said first flow adapter is attached to and extends beyond said second end.

5. The rocket of claim 1, wherein:
   said first rocket engine vent system conduit is disposed about a center reference axis and comprises first and second beveled surfaces, wherein said first and second vent apertures are disposed on said first and second beveled surfaces.

6. The rocket of claim 5, wherein:
   said first rocket fuel engine system conduit comprises a downstream end, wherein both of said first and second beveled surfaces extend toward said center reference axis progressing in a direction of said downstream end.

7. The rocket of claim 5, wherein:
   said first and second beveled surfaces are disposed about 180 degrees apart.

8. The rocket of claim 1, wherein:
   said first and second vent apertures are each contained within a reference plane that is disposed an angle relative to a center reference axis about which said first-rocket engine vent system conduit is disposed.

9. The rocket of claim 1, wherein:
   said first rocket fuel engine system conduit comprises first and second ends, wherein said first end is interconnected with said upper stage rocket engine, wherein said second end is opposite said first end, wherein said second end is closed, and wherein said first and second vent apertures are disposed between said first and second ends at least generally proximate said second end.

10. The rocket of claim 1, wherein:
    a surface area occupied by said first and second vent apertures is greater than a cross-sectional area of said first rocket engine vent system conduit taken perpendicularly to a center reference axis about which said first rocket engine vent system conduit is disposed.

11. The rocket of claim 1, wherein:
    said first and second vanes comprise first and second means for directing first and second fluid flows, respectively, out of said first and second fuel apertures, respectively.

12. The rocket of claim 1 wherein:
    said first and second vanes comprise first and second arcuate surfaces, respectively.

13. The rocket of claim 12, wherein:
    said first and second arcuate surfaces are each defined by a single radius.

14. The rocket of claim 13, wherein:
    said first flow diverter comprises an upstream end, wherein said upstream end is defined by an intersection of said first and second arcuate surfaces which is at least substantially in a form of an edge.

15. The rocket of claim 1, wherein:
    said first flow diverter comprises an upstream end and a downstream end, wherein said first and second vanes each extend at least generally away from a center reference axis about which said first rocket engine vent system conduit is disposed progressing toward said downstream end.

16. The rocket of claim 15, wherein:
    said first and second vanes are disposed in opposing relation.

17. The rocket of claim 15, wherein:
    said upstream end of said first flow diverter is an upstream edge that is defined by an intersection of said first and second vanes.

18. The rocket of claim 1, wherein:
    said first and second vanes are disposed an angle relative to a center reference axis about which said first rocket engine vent system conduit is disposed.

19. The rocket of claim 1, wherein:
    an upstream end of said first flow diverter is disposed downstream of an upstream edge of each of said first and second vent apertures.

20. The rocket of claim 1, further comprising:
    an interstage adapter interconnected with said upper stage, wherein said spacecraft and said interstage adapter are disposed on opposite ends of said upper stage, wherein said first rocket engine vent system conduit comprises first and second legs, wherein said first and second vent apertures are located on said first leg, wherein said second leg is slidably disposed over said first leg and including said first and second vent apertures when said interstage adapter is interconnected with said upper stage, wherein said first leg is interconnected with said upper stage, wherein said second leg is interconnected with said interstage adapter, and wherein said second leg extends through an outer wall of said interstage adapter.

21. The rocket of claim 20, wherein:

said second leg slides off said first leg when said interstage adapter is released from said upper stage.

22. The rocket of claim 20, further comprising:

a lower stage comprising a lower stage rocket engine, wherein said interstage adapter interconnects said upper and lower stages.

23. A rocket, comprising:

a spacecraft;

an upper stage interconnected with said spacecraft and comprising an upper stage rocket engine;

a rocket engine vent system fluidly interconnected with said upper stage rocket engine, wherein said rocket engine vent system comprises a first rocket engine vent system conduit, wherein said first rocket engine vent system conduit comprises first means for directing a first fluid flow out of said first rocket engine vent system conduit in a first direction, wherein said first direction is at an angle relative a center reference axis about which said first rocket engine vent system conduit is disposed.

24. The rocket of claim 23, wherein:

said first direction is at least generally transverse to said center reference axis.

25. The rocket of claim 23, further comprising:

second means for directing a second fluid flow out of said first rocket engine vent system conduit in a second direction, wherein said second direction is at an angle relative said center reference axis.

26. The rocket of claim 25, wherein:

said first and second directions are at least substantially directly opposite each other.

27. A rocket, comprising:

a spacecraft;

an upper stage interconnected with said spacecraft and comprising an upper stage rocket engine; and an upper stage rocket engine vent system fluidly interconnected with said upper stage rocket engine and comprising a first rocket engine vent system conduit, wherein said first rocket engine vent system conduit comprises first and second vent apertures that extend entirely through a wall thickness of a first conduit section of said first rocket engine vent system conduit, as well as a first flow diverter that is disposed within said first conduit section, wherein said first flow diverter comprises first and second vanes that are disposed within said first conduit section and that project toward said first and second vent apertures, respectively, wherein said first rocket engine vent system conduit comprises a second conduit section and a separate first flow adapter that is interconnected with said second conduit section, wherein said first flow adapter comprises said first conduit section and said first flow diverter.

28. The rocket of claim 27, wherein:

said second conduit section comprises first and second ends, wherein said first end is interconnected with said upper stage rocket engine, wherein said second end is spaced from said upper stage rocket engine, and wherein said first flow adapter is attached to and extends beyond said second end.

29. A rocket, comprising:

a spacecraft;

an upper stage interconnected with said spacecraft and comprising an upper stage rocket engine; and an upper stage rocket engine vent system fluidly interconnected with said upper stage rocket engine and comprising a first rocket engine vent system conduit, wherein said first rocket engine vent system conduit comprises first and second vent apertures that extend entirely through a wall thickness of a first conduit section of said first rocket engine vent system conduit, as well as a first flow diverter that is disposed within said first conduit section, wherein said first flow diverter comprises first and second vanes that are disposed within said first conduit section and that project toward said first and second vent apertures, respectively, wherein said first rocket engine vent system conduit is disposed about a center reference axis and comprises first and second beveled surfaces, wherein said first and second vent apertures are disposed on said first and second beveled surfaces.

30. The rocket of claim 29, wherein:

said first rocket engine vent system conduit comprises a downstream end, wherein both of said first and second beveled surfaces extend toward said center reference axis progressing in a direction of said downstream end.

31. The rocket of claim 29, wherein:

said first and second beveled surfaces are disposed about 180 degrees apart.

32. A rocket, comprising:

a spacecraft;

an upper stage interconnected with said spacecraft and comprising an upper stage rocket engine;

an upper stage rocket engine vent system fluidly interconnected with said upper stage rocket engine and comprising a first rocket engine vent system conduit, wherein said first rocket engine vent system conduit comprises first and second vent apertures that extend entirely through a wall thickness of a first conduit section of said first rocket engine vent system conduit, as well as a first flow diverter that is disposed within said first conduit section, wherein said first flow diverter comprises first and second vanes that are disposed within said first conduit section and that project toward said first and second vent apertures, respectively; and an interstage adapter interconnected with said upper stage, wherein said spacecraft and said interstage adapter are disposed on opposite ends of said upper stage, wherein said first rocket engine vent system conduit comprises first and second legs, wherein said first and second vent apertures are located on said first leg, wherein said second leg is slidably disposed over said first leg and including said first and second vent apertures when said interstage adapter is interconnected with said upper stage, wherein said first leg is interconnected with said upper stage, wherein said second leg is interconnected with said interstage adapter, and wherein said second leg extends through an outer wall of said interstage adapter.

33. The rocket of claim 32, wherein:

said second leg slides off said first leg when said interstage adapter is released from said upper stage.

34. The rocket of claim 32, further comprising:

a lower stage comprising a lower stage rocket engine, wherein said interstage adapter interconnects said upper and lower stages.

\* \* \* \* \*

UNITED STATES PATENT AND TRADEMARK OFFICE
CERTIFICATE OF CORRECTION

PATENT NO. : 6,499,696 B1 Page 1 of 1
DATED : December 31, 2002
INVENTOR(S) : Malinowski It is certified that error appears in the above-identified patent and that said Letters Patent is hereby corrected as shown below:

Column 13,
Line 56, delete the word "fuel";
Line 56, after the word "engine", and insert -- vent --;
Line 67, delete the word "first-rocket", and insert therefor -- first rocket --;

Column 14,
Line 2, delete the word "fuel"; and
Line 2, after the word "engine", and insert -- vent --.

Signed and Sealed this

Twentieth Day of May, 2003

JAMES E. ROGAN
*Director of the United States Patent and Trademark Office*